(12) United States Patent
Farahani et al.

(10) Patent No.: US 8,582,316 B2
(45) Date of Patent: Nov. 12, 2013

(54) ELECTRONIC DEVICE DISPLAY ALIGNMENT SYSTEM

(75) Inventors: Houtan R. Farahani, San Ramon, CA (US); Larry A. Barham, Fremont, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 13/228,282

(22) Filed: Sep. 8, 2011

(65) Prior Publication Data

US 2013/0063920 A1   Mar. 14, 2013

(51) Int. Cl.
*H01K 7/02*   (2006.01)
*H01K 7/04*   (2006.01)

(52) U.S. Cl.
USPC .............. 361/807; 361/679.21; 361/679.55

(58) Field of Classification Search
USPC .............. 361/679.21, 679.26, 679.29, 679.3, 361/679.55, 679.56, 807; 313/582; 349/58–60; 345/173
See application file for complete search history.

(56) References Cited

U.S. PATENT DOCUMENTS

| | | | |
|---|---|---|---|
| 7,126,651 B2 * | 10/2006 | Kim et al. | 349/58 |
| 7,134,780 B2 | 11/2006 | Tsai | |
| 7,274,560 B2 * | 9/2007 | Jeong et al. | 361/679.27 |
| 7,515,221 B2 * | 4/2009 | Jeon | 349/58 |
| 7,595,979 B2 * | 9/2009 | Shi et al. | 361/679.21 |
| 7,965,498 B2 | 6/2011 | Gotham et al. | |
| 8,199,477 B2 * | 6/2012 | Mathew et al. | 361/679.29 |
| 2004/0212755 A1 * | 10/2004 | Fukayama et al. | 349/58 |
| 2007/0263347 A1 * | 11/2007 | Hong et al. | 361/681 |
| 2010/0302473 A1 | 12/2010 | Poveda et al. | |

* cited by examiner

*Primary Examiner* — Bernard Rojas
(74) *Attorney, Agent, or Firm* — Womble Carlyle Sandridge & Rice LLP

(57) ABSTRACT

A display alignment system aligns an internal display device with an outer cover glass such that planes defined by both are substantially parallel. A subject electronic device includes an outer housing having a back portion and multiple mounting bosses, a transparent display cover coupled to the outer housing, a display device disposed between the back portion and the display cover, and mounting brackets coupling the display device to the mounting bosses. The exact positions of the mounting brackets are adjusted to compensate for the specific dimensions of the mounting bosses, outer housing and/or display device, which is done using a separate assembly fixture having spring-loaded and locking pins to record individual mounting boss heights. Recorded boss heights are used to position the mounting brackets on sides of the display device so that the combination thereof is customized for the recorded outer housing and mounting bosses.

20 Claims, 10 Drawing Sheets

ELECTRONIC DEVICE DISPLAY ALIGNMENT SYSTEM

TECHNICAL FIELD

The present invention relates generally to computing devices, and more particularly to systems and methods for aligning components on computing devices.

BACKGROUND

Personal electronic devices having relatively large display screens are becoming increasingly popular. For example, many cellular telephones and portable tablet devices now have display screens that comprise most or all of the entire front face of the device. Particular examples of such devices include the iPhone® and iPad® product lines that are offered by Apple Inc. of Cupertino, Calif. Similarly, many laptop computers have display screens that comprise much or all of the entire top half of the overall device. Such designs advantageously tend to maximize the size of the display screen for a given device footprint, which is an attractive feature for many consumers.

Of course, various issues must be taken into account when designing a device with such a relatively large display screen. In addition to sizing, support and aesthetic appearance considerations, many device makers also desire to provide some sort of protection with respect to the front face of the display, particularly where the front face may also include a touch screen type of input for the user. This is often accomplished by providing a flat, thin, and transparent outer display cover or "cover glass" that is separate from the actual display component or device itself. Such an outer display cover can be relatively inexpensive in comparison with a full display component or device, such that scratches, cracks or other damage to the outside of the device can typically be remedied by repairing or replacing the outer cover glass rather than the entire internal display device.

Such an outer display cover and internal display device arrangement often includes a gasket, seal, enclosed space, or other similar protection between the two closely placed items. This seal or other protection tends to ward against moisture, dust and other contaminants that may get trapped between the display cover and internal display device screen, which contaminants could then result in a less optimal or even unusable display for the device user.

Unfortunately, the ability to effect a suitable seal or other similar protection can be challenging within the context of the mass production of devices. Even slight defects or small variances in part dimensions from device to device can lead to enough of a misalignment between an individual display device and cover glass to cause problems. The resulting poor sealing or uneven gasket compression can then cause eventual condensation, contamination or other negative effects with respect to the display. These display alignment issues can be exacerbated as the display size increases, such that the relatively large displays of many tablet devices and laptop computers can be particularly impacted. Solutions can involve imposing tighter tolerances and restrictions on individual parts and features, although this can then lead to more inconvenience and higher manufacturing costs.

While many designs and techniques used to provide protective seals for relatively large display screens on electronic and computing devices have generally worked well in the past, there is always a desire to provide improvements in such designs and techniques. Therefore, the ability to accurately align components during device manufacture to result in reliable protective seals on computing devices having large display screens without requiring unduly tight part tolerances is desired.

SUMMARY

It is an advantage of the present invention to provide better aligned components in computing devices, such as improved and more reliable alignments between display devices and cover glasses, during the manufacture of computing devices without needing to resort to tighter but costly part tolerances. This can be accomplished at least in part through the use of a separate assembly fixture that accounts for the exact locations and/or dimensions of various mounting features and/or datums on one or more device components. In this manner, there can be a customized mounting and assembly of a given display device, given cover glass and given device housing to result in well aligned display components.

Broadly speaking, the embodiments disclosed herein describe a computing or electronic device component alignment system, as well as the computing device itself and the method of aligning components thereon. In one particular example, a video display component defines a given plane that is made substantially parallel with a plane defined by an associated cover glass. This can be done using a separate assembly fixture with spring loaded and locking pins to record individual mounting boss heights on the outer housing. The recorded mounting boss heights can then be used to specifically position mounting brackets on the sides of the video display component so that the video display and mounting bracket combination is customized for the recorded outer housing and mounting boss combination.

In various embodiments, an electronic device can generally include an outer housing, a display cover, a display device disposed between the outer housing and display cover, and one or more mounting components coupling the display device to the outer housing. The outer housing can include a back portion having an outer surface and an inner region, with the inner region including a plurality of mounting features. The display cover can be affixed or otherwise coupled to the outer housing, can be adapted to be viewable therethrough, and can define a first plane. The display device can have a front face defining a second plane, and can be adapted to provide a video or other visual display for a user thereon. The mounting component(s), which can be mounting brackets coupled to the sides of the display device, can couple the display device to the plurality of mounting features, which mounting features can be mounting bosses extending from the outer housing. The specific positioning of the mounting components can be adjustable to compensate for the specific dimensions of the outer housing and display device, such that the second plane is substantially parallel to the first plane.

In various detailed embodiments, the one or more mounting components can be specifically positioned using a separate assembly fixture having a plurality of spring loaded and locking pins. Each of the spring loaded and locking pins can be adapted to measure and record the height or other dimension of one of the plurality of mounting features, such that a respective mounting component can be positioned accordingly for final assembly. The separate assembly fixture is not part of the overall electronic device, and can be reused to provide customized alignments of mounting brackets to couple display devices to outer housings to display covers in numerous manufactured electronic devices. In various specific embodiments, the electronic device can also include a compressible gasket situated between the display cover and the display device, such that the compressible gasket provides a seal between the display cover and display device that blocks contamination therefrom.

In various alternative embodiments, a separate assembly fixture adapted for use in the manufacture of an electronic device can include a fixture body, a plurality of recording pins located thereon, and one or more release mechanisms associated with the recording pins. The fixture body can have a top surface, a bottom surface and an outer circumference that is dimensioned to permit interaction with a plurality of different components from the separate electronic device. The fixture body can also define a frame having a hollowed interior region in some embodiments. The plurality of recording pins can comprise spring-loaded and locking pins situated proximate the top surface of the fixture body. Such pins can be adapted to be actuated by and record the height of a corresponding mounting feature located on an outer housing component of the separate electronic device when the outer housing component is interfaced with the assembly fixture. The release mechanism(s) can facilitate the release and reset of the pins from locked to unlocked positions so that the assembly fixture can be then used with a different separate electronic device.

In still further embodiments, various methods of aligning components on an electronic device can include the steps of interfacing a separate assembly fixture with an outer housing or other electronic device component having a plurality of mounting features, actuating a plurality of spring-loaded and locking pins on the assembly fixture while the component is so interfaced, recording the respective heights of the plurality of mounting features using the respective positions of the actuated plurality of spring-loaded and locking pins, removing the first electronic device component form the assembly fixture, interfacing an internal display device or other electronic device component with the assembly fixture, coupling one or more mounting components to the second electronic device component in one or more specific locations that correspond to the recorded heights of the plurality of mounting feature, and then coupling the one or more mounting components to the plurality of mounting features. If necessary, the spring-loaded and locking pins (i.e., "recording pins") can be reset as part of the process. In addition, the interfacing steps can involve placing a datum of the separate assembly fixture into contact with a corresponding datum of the respective electronic device component. Also, the recording step can include locking the plurality of pins into place.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive electronic device display alignments systems. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a personal computing device, such as any of various cellular telephones, tablet devices, laptop computers, desktop computers, and the like manufactured by Apple Inc. of Cupertino, Calif. Although the various embodiments set forth in detail herein are described with respect to such personal computing devices, it will be readily appreciated that the various embodiments set forth herein can also apply to other forms of computing devices. For example, large screen commercial use computers, among other computing and electronic devices, can also utilize the various component alignment systems, fixtures and details of the present invention. In addition, although the various detailed embodiments disclosed herein focus on display devices for purposes of illustration, it will also be readily appreciated that present invention can also apply to the alignments of other types of components used within computing devices.

Computing Devices

Figure 1A:
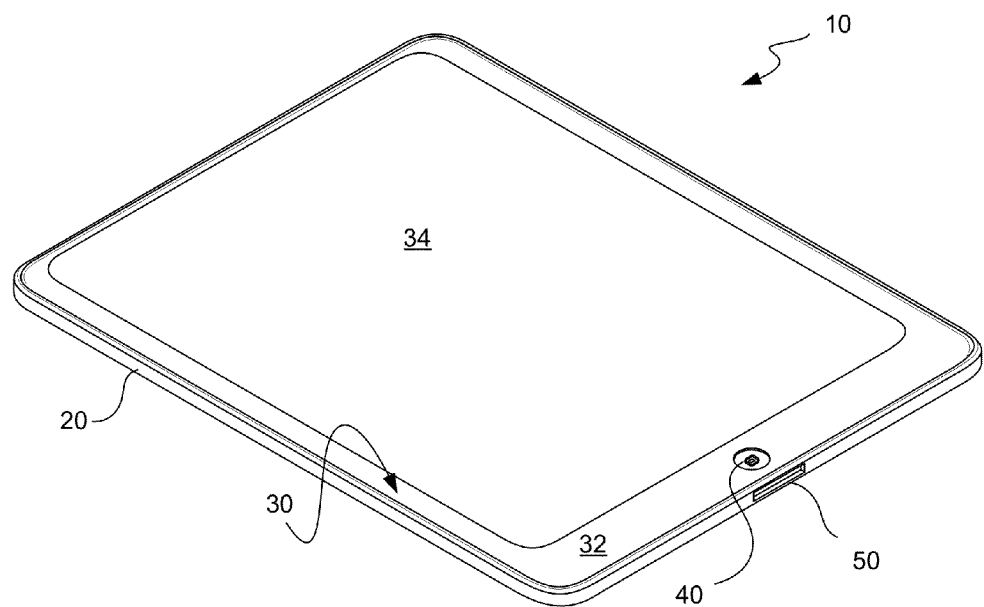
FIG. 1A illustrates in top perspective view an exemplary personal computing device.

One example of a personal computing device in the form of a tablet computer is shown in top perspective view in FIG. 1A. As shown, tablet computer 10 can generally include an outer housing 20, and a cover glass 30 having a masked frame region 32 and a relatively large display region 34. Various internal components (not shown) can be included within an inner cavity created by the outer housing 20 and cover glass 30 combination, which can include an internal display device, one or more processors, storage components, circuit boards, power supplies, and the like. A home button 40 and input/output port 50 can also be included on tablet computer 10, as well as various other components and features, as will be readily appreciated.

Figure 1B:
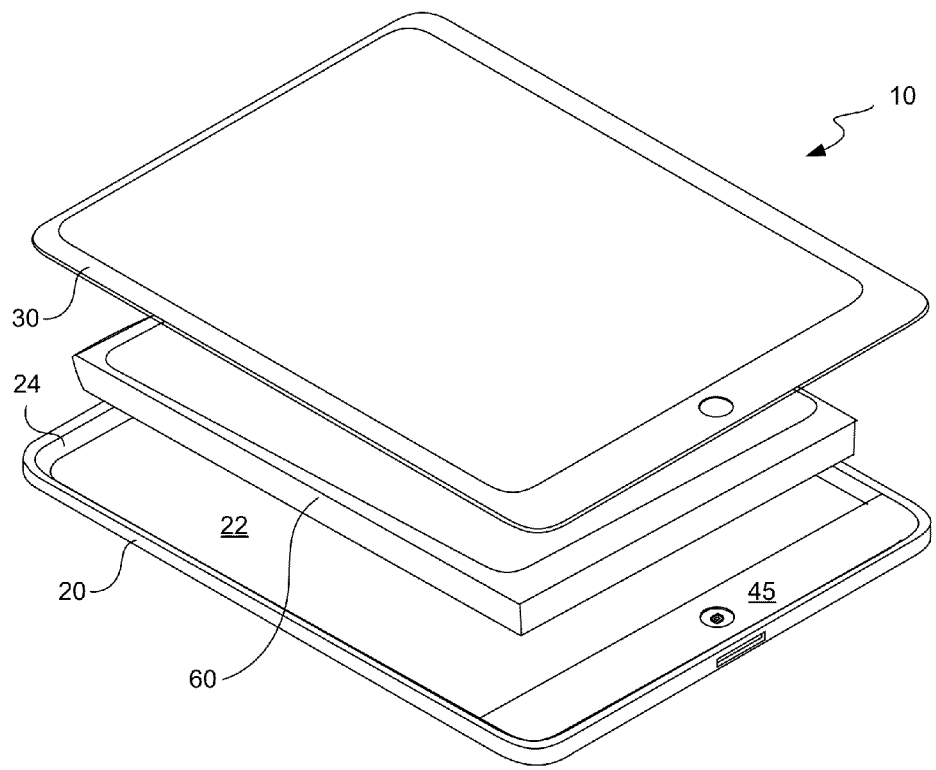
FIG. 1B illustrates in partially exploded perspective view the personal computing device of FIG. 1A.

Continuing with FIG. 1B, the personal computing device of FIG. 1A is shown in partially exploded perspective view. Tablet computer 10 can generally include an outer housing 20 and cover glass 30, as well as an internal display device or system 60 that is housed between the outer housing and cover glass. The outer housing 20 can include an inner surface or region 22 at its bottom, as well as one or more integrally formed side walls 24. The cover glass 30 can include an opening therethrough to accommodate the home button, and a home button region 45 and associated components therefore can be assembled into a suitable region of the outer housing 20, details of which need not be presented here.

Figure 1C:
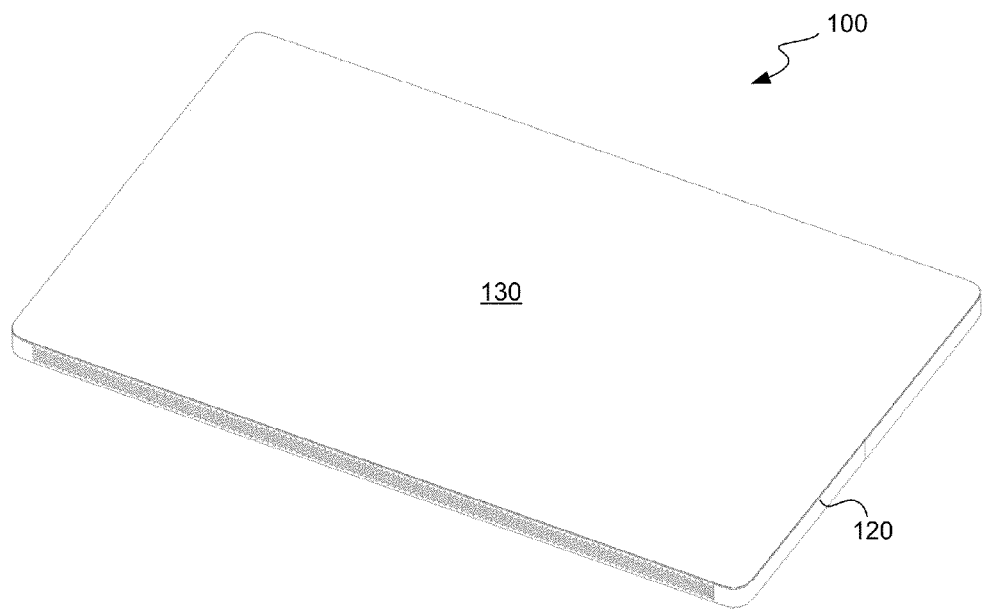
FIG. 1C illustrates in top perspective view an alternative exemplary personal computing device.

An alternative example of a personal computing device in the form of a cinema display for a desktop computer is shown in top perspective view in FIG. 1C. As shown, cinema display 100 can generally include an outer housing 120, and a cover glass 130. Various internal components (not shown) can be included within an inner cavity created by the outer housing 120 and cover glass 130 combination, which can include an internal display device, one or more processors, storage components, circuit boards, power supplies, and the like.

Figure 1D:
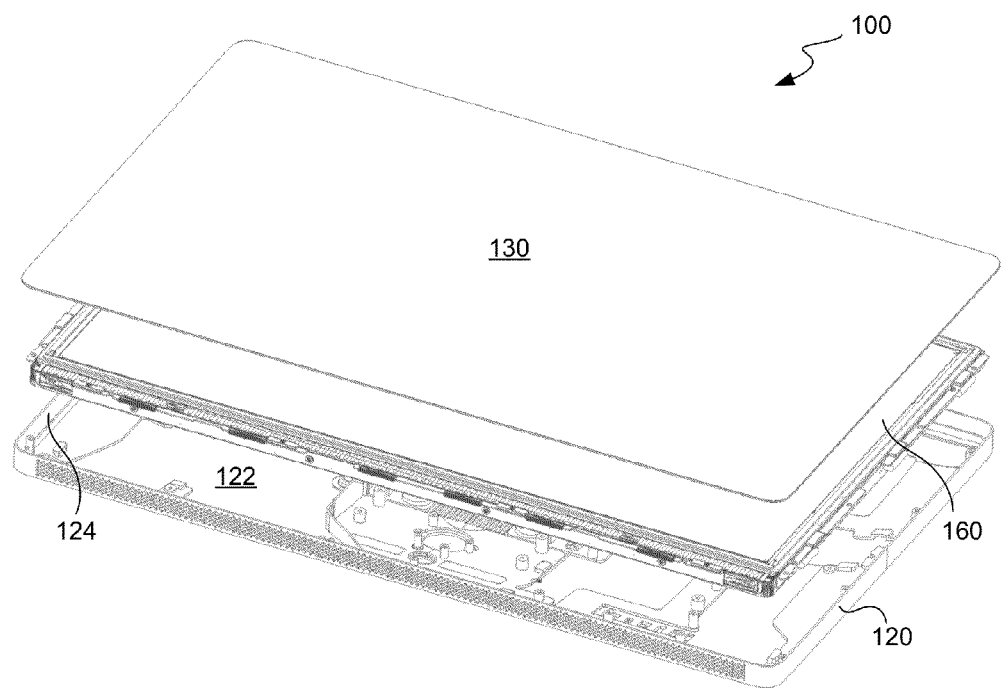
FIG. 1D illustrates in partially exploded perspective view the alternative personal computing device of FIG. 1C.

Continuing with FIG. 1D, the personal computing device of FIG. 1C is shown in partially exploded perspective view. Cinema display 100 can generally include an outer housing 120 and cover glass 130, as well as an internal display device or system 160 that is housed between the outer housing and cover glass. The outer housing 120 can include an inner surface or region 122 at its bottom, as well as one or more integrally formed side walls 124. Various other associated components can be assembled into a suitable region between the outer housing 120 and cover glass 130, details of which need not be presented here.

As noted above, it is generally preferable that the cover glass or display cover (i.e., 30 or 130) be well aligned with the display face of the internal display device (i.e., 60 or 160 respectively). Slight tilting, offset or other discrepancies between these components can affect the ability to seal off adequately the space therebetween, such that moisture, dust and other contaminants can cause problems. In addition, misaligned or tilted display presentations can be generally undesirable for aesthetic purposes.

Display Alignment System

Figure 2A:
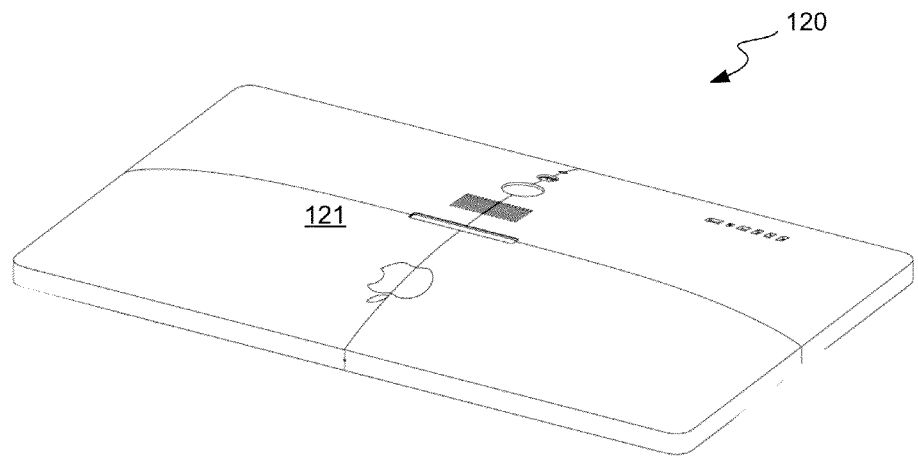
FIG. 2A illustrates in obverse perspective view an exemplary personal computing device outer housing component according to one embodiment of the present invention.
Figure 2B:
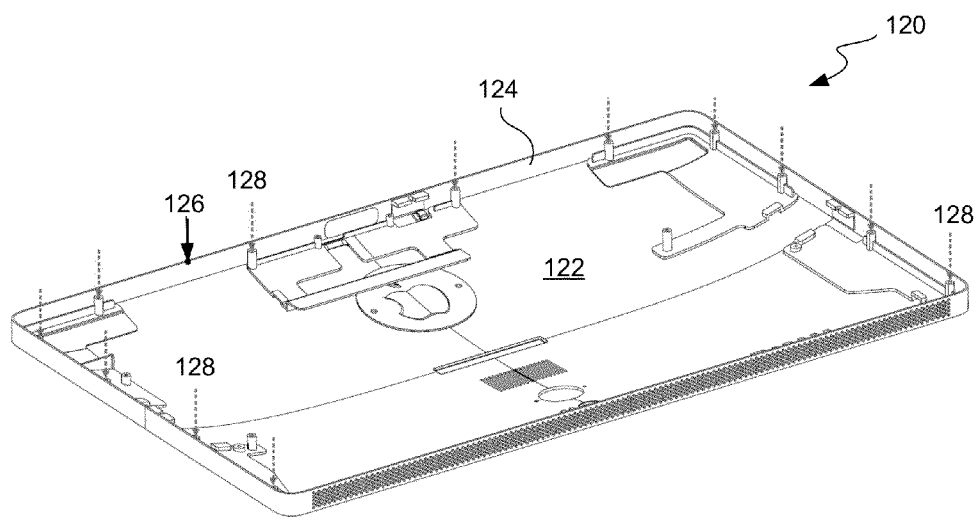
FIG. 2B illustrates in top perspective view the outer housing component of FIG. 2A according to one embodiment of the present invention.

Turning next to FIG. 2A, an exemplary outer housing component of a personal computing device is shown in obverse perspective view. Outer housing component 120 can be formed from a single piece of material, such as aluminum or plastic, for example. Outer housing component 120 can include a substantial back portion having an outer surface 121, and be slightly convex in nature, although such curvature is not necessary. One or more logos, vents, openings, ports or other features may be present at the outer surface of housing component 120, details of which need not be covered herein. Continuing with FIG. 2B, the outer housing component of FIG. 2A is illustrated in top perspective view. Outer housing component 120 can again include a substantial back portion having an inner surface or region 122, as well as one or more side walls or regions 124 around its perimeter. Such side walls can be integrally formed with the back portion, and can end at a thin upper edge 126. In various embodiments, upper edge 126 can form a housing reference datum that can be used for assembly and alignment purposes, as set forth in greater detail below. Such an upper edge or housing reference datum 126 is preferably atop at least one side wall, and can extend around the entire circumference of outer housing component 120.

In addition, a plurality of mounting features 128 can be included with outer housing 120. Such mounting features 128 can be integrally formed with the outer housing 120, or can be attached or otherwise coupled to its inner surface or region 122. For example, multiple mounting features 128 can be integrally formed with separate thin brackets, which brackets are then welded, adhered or otherwise affixed to the inner surface 122 of the outer housing component 120. As shown, mounting features 128 can comprise mounting bosses that extend away from the outer housing component 120 toward the internal space of the overall electronic device. Although each side wall 124 is depicted as having four such mounting bosses or features 128 for a total of sixteen around the full housing perimeter, it will be readily appreciated that more or fewer mounting features may alternatively be used. In general, each of the mounting bosses or features 128 can be used to fasten or otherwise couple the outer housing to one or more other major device components, such as, for example, an internal display device.

Figure 3:
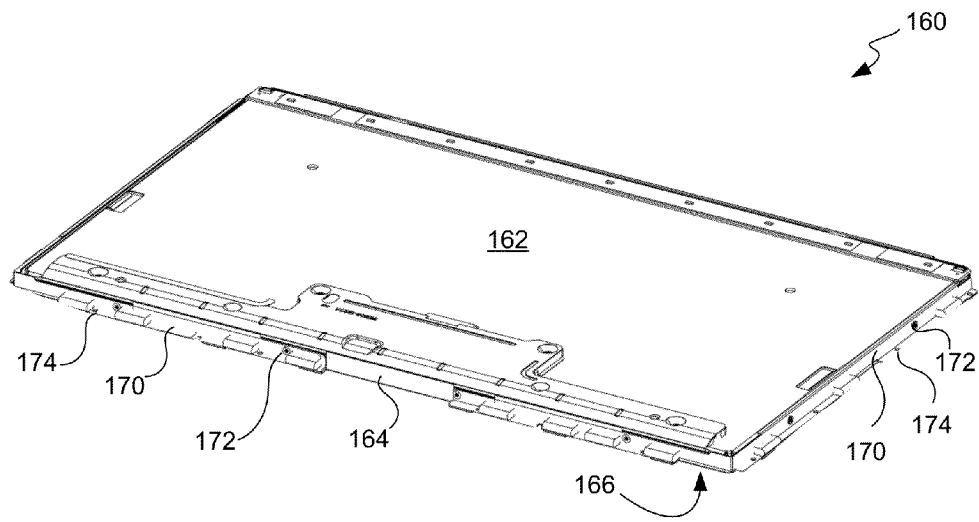
FIG. 3 illustrates in obverse perspective view an exemplary display device with a plurality of mounting brackets attached thereto according to one embodiment of the present invention.

Moving next to FIG. 3, an exemplary display device with a plurality of mounting brackets attached thereto according to one embodiment of the present invention is shown in obverse perspective view. Display device or system 160 can be, for example, a complete and independently housed and ported video display device, such as an LCD or plasma display. Display device 160 can have a front face adapted to provide a display to a user (not shown), and a back side 162 on the obverse face opposite the front face. At least one surface 166 on the separate housing of the display device unit 160 can function as a display reference datum that can be used for assembly and alignment purposes, as also set forth in greater detail below. Similar to the housing reference datum above, such a display reference datum 166 can extend around the circumference of the display device 160.

One or more mounting components 170 can be coupled to the thin side walls 164 of the display device. Such mounting components 170 can be, for example, mounting brackets that are directly affixed to a side wall 164 by way of one or more side screws 172. Flange portions extending away from the mounting brackets 170 can include one or more openings 174 to facilitate the eventual screwing, mounting or other attachment of the mounting brackets to the mounting bosses or features 128 located on the outer housing 120 above.

As noted above, it is generally desirable that display device 160 be mounted with respect to outer housing 120 and an associated cover glass in a manner such that the front display face of the display device and the cover glass are well aligned. Such mounting can be accomplished by way of coupling the mounting components 170 and mounting features 128. Preferably, the final alignment results in a plane defined by the front face of the display device being substantially parallel to a plane defined by the cover glass. Such a result can be frustrated, however, in the mass production of parts and devices. Slight variations and discrepancies from part to part and the various features thereof can cause unevenness in such alignments, particularly as the overall display size increases.

While the exact heights of the mounting bosses 128 can be controlled by way of precise machining in many cases, implementing tighter tolerances on these heights can be costly in a mass production environment. Furthermore, other defects or slight warping across the outer housing 120 itself can reduce the effectiveness of such precise machining. As such, additional systems and techniques that can improve display to cover glass alignment would prove to be useful.

Figure 4:
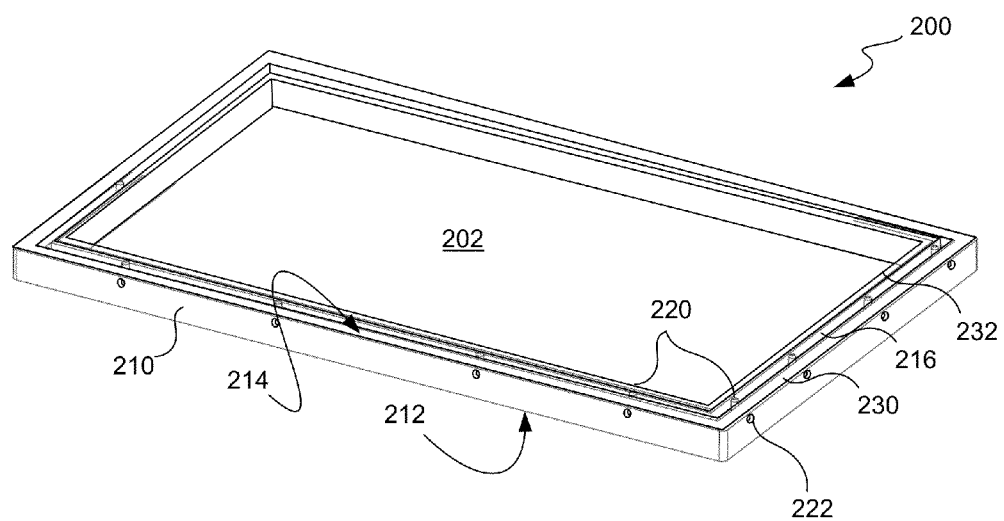
FIG. 4 illustrates in top perspective view an exemplary separate assembly fixture according to one embodiment of the present invention.

FIG. 4 illustrates in top perspective view an exemplary separate assembly fixture according to one embodiment of the present invention. Assembly fixture 200 is generally adapted for use in the manufacture of a separate electronic device, such as an electronic device formed by outer housing 120 and display device 160, among other device components. Of course, such an assembly fixture is not an actual part of the electronic device itself, but rather is used during the manufacture of the device. Assembly fixture 200 can include a fixture body 210 that generally defines a frame shape having an open interior region 202, as well as a bottom surface or region 212 and a top surface or region 214. Although a frame shape is shown for purposes of illustration and discussion, it will be readily appreciated that such an open frame shape is not absolutely necessary. Alternatively, a solid shape with no open interior region could be used.

The size and outer circumference of assembly fixture 200 can be dimensioned to permit interaction with a plurality of different components from the separate electronic device. In particular, assembly fixture can be dimensioned and adapted to interface in separate instances with both outer housing 120 and then with display device 160. Such sequential interfacings can be used to facilitate recording and using the exact dimensions of the various mounting features 128 and/or other components, such that a customized mounting of device components can result in a more accurate alignment of the components.

To aid in this result, a plurality of recording pins 220 can be situated proximate top surface or region 214 of the fixture body 210. In some embodiments, such recording pins 220 can located within a groove or other recess 216 located along the top surface or region 214. Each pin 220 can have an associated port, relief, or other channel 222 to assist with actuation, locking and/or release of the pin, as may be applicable. Recording pins 220 can be locking pins, such that each of the pins is adapted to move up and down and be locked in place when desired. These pins can also be spring-loaded or otherwise biased, or can alternatively be pneumatically or hydraulically actuated, as may be desired for a given design. In some embodiments, pins 220 can be aligned to move linearly straight up and down, such as where openings or other connection points on housing mounting features 128 (shown above) are to correspond directly with openings 174 or other connection points on mounting components 170 (shown above).

Alternatively, the recording pins 220 can be designed or aligned to skew as may be necessary to account for any discrepancies in the design or alignments of the mounting features and mounting components that are coupled thereby. For example, where recording pins 220 move and measure height axially in the Z direction, the pins could also reside on an X-Y stage or component (not shown) that allows for separate movement of the pins within the X-Y plane before and/or after the measured Z heights of the pins are recorded.

In any event, recording pins 220 can be adapted to come in contact with and be positioned by respective mounting features or bosses 128 when the outer housing 120 interfaces with the assembly fixture 200. Upon being locked in place during this interfacing, the exact positioning of all the pins 220 can then be used to customize mounting when the outer housing 120 is removed and a corresponding display device 160 subsequently interfaces with the assembly fixture 200. A locking mechanism can be included with each pin for such purpose, and a release mechanism can be associated with each pin as well, such that the locked pin can be released and reset for use with another set of electronic device components. Such a release mechanism can be individualized for each recording pin, or a global ring or other mass release mechanism to release and reset all of the recording pins simultaneously can be implemented for such purpose, as will be readily appreciated.

In addition to the locking pins 220, the assembly fixture 200 can also include one or more reference datums to assist in improving component alignment. For example, reference datums 230 and 232 can be located along the top region 214 of assembly fixture 200. Outer reference datum 230 can be located toward the outer portion of the assembly fixture, and can be used in conjunction with the outer housing component 120 during interfacing therewith. Further, inner reference datum 232 can be located toward the inner portion of the assembly fixture, and can be used in conjunction with the display device 160 during interfacing therewith.

Figure 5A:
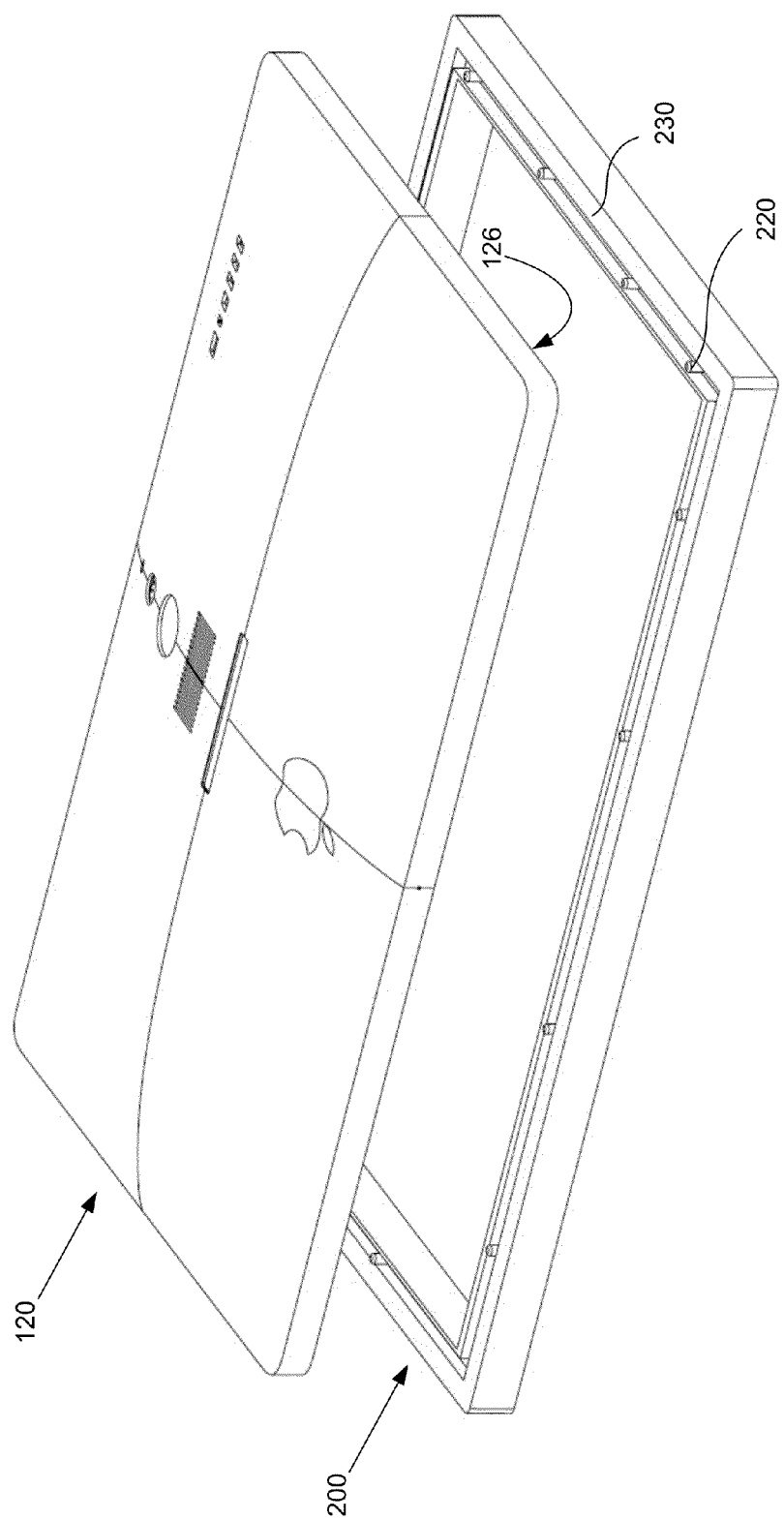
FIG. 5A illustrates in perspective view the outer housing component of FIG. 2A as ready to interface with the separate assembly fixture of FIG. 4 according to one embodiment of the present invention.
Figure 5B:
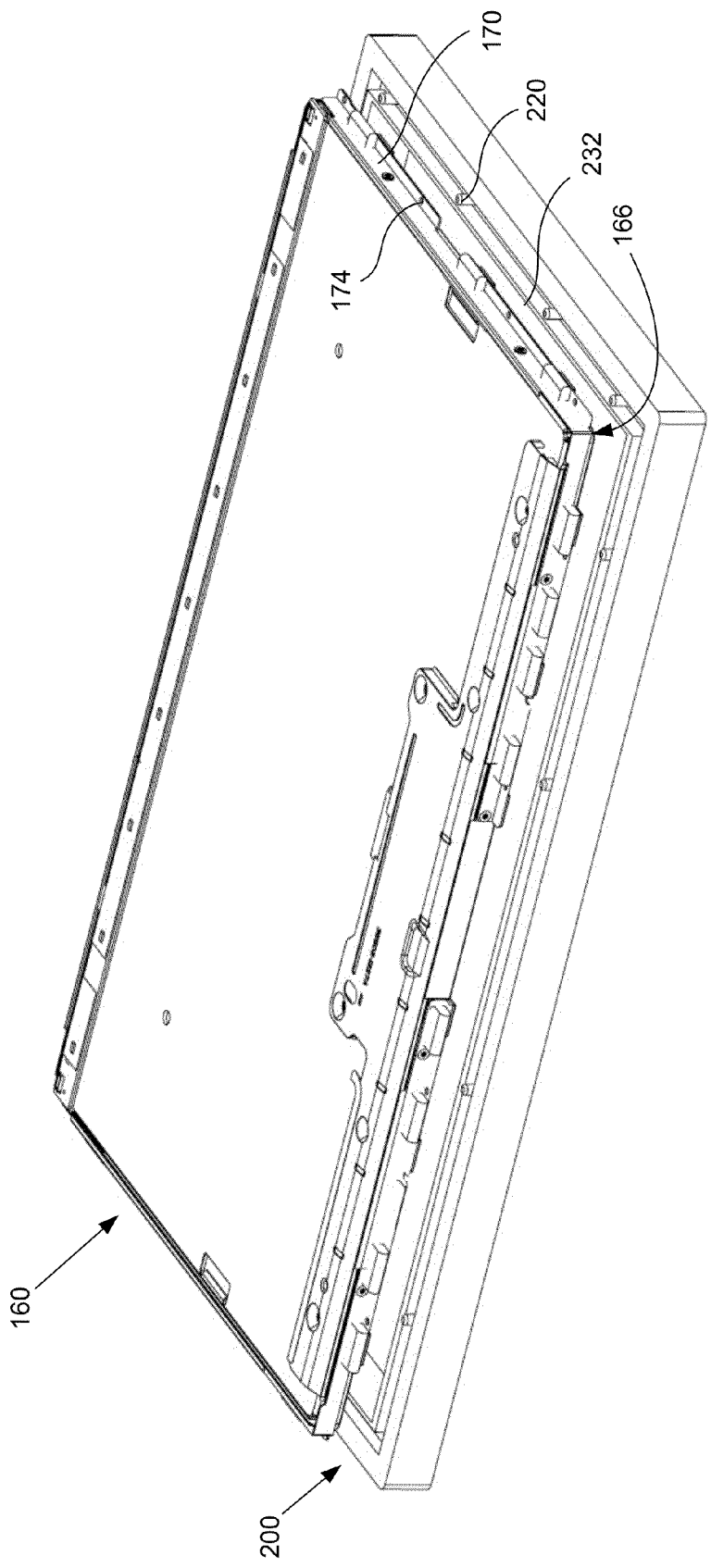
FIG. 5B illustrates in perspective view the display device of FIG. 3 as ready to interface with the separate assembly fixture of FIG. 4 according to one embodiment of the present invention.

Such interfacings may be better understood with reference to FIGS. 5A and 5B. FIG. 5A illustrates in perspective view the outer housing component of FIG. 2A as ready to interface with the separate assembly fixture of FIG. 4, while FIG. 5B similarly illustrates in perspective view the display device of FIG. 3 as ready to interface with the separate assembly fixture of FIG. 4. As can be seen from FIGS. 5A and 5B, assembly fixture 200 can be specifically dimensioned so as to interface readily and effectively with both outer housing 120 and display device 160, albeit at separate times.

In particular, the first interfacing shown in FIG. 5A involves housing reference datum 126 around the outer housing 120 contacting the outer reference datum 230 around the assembly fixture 200. In addition, the upper end of each of the recording pins 220 contacts the lower end of each of the mounting bosses 128 (not visible from this perspective) within the outer housing. Each recording pin is then pushed or otherwise moved linearly to a specific location that corresponds to the exact height of its respective mounting boss. Each recording pin can then be locked in place, and the outer housing can be removed from the assembly fixture.

In the subsequent or second interfacing shown in FIG. 5B, a corresponding display device 160 is then interfaced with the assembly fixture 200 while the recording pins 220 are all still locked into place with the individual readings from the outer housing mounting bosses. Similar to the foregoing, this second interfacing involves display reference datum 166 around the front face of display device 160 contacting the inner reference datum 232 around the assembly fixture 200. In some embodiments, the assembly fixture 200 can include different heights for the inner reference datum 232 and outer reference datum 230, so as to more readily facilitate the rapid yet accurate interfacing of components. As illustrated here, inner reference datum 232 is higher than outer reference datum 230, with a groove or recess 216 and the recording pins 220 being located therebetween.

While the display device 160 is interfaced with the assembly fixture 200, one or more mounting brackets or components 170 are then precisely positioned along the sides of the display device based upon the positions of the various locked recording pins 220. In some embodiments, each side of the display device 160 can include two loosely coupled mounting brackets 170, and each mounting bracket can have an extended flange that directly contacts two recording pins, such as where mounting openings or holes 174 are located therethrough. Once a given mounting bracket 170 is specifically positioned to rest right atop its two locked pins 220, the mounting bracket can be affixed in place by way of respective side screws 172. When the display device and mounting bracket combination is then coupled with the respective outer housing 120 upon which the locked pins read, the mounting brackets will be appropriately located to effect an accurate mounting and alignment of parts.

Figure 6:
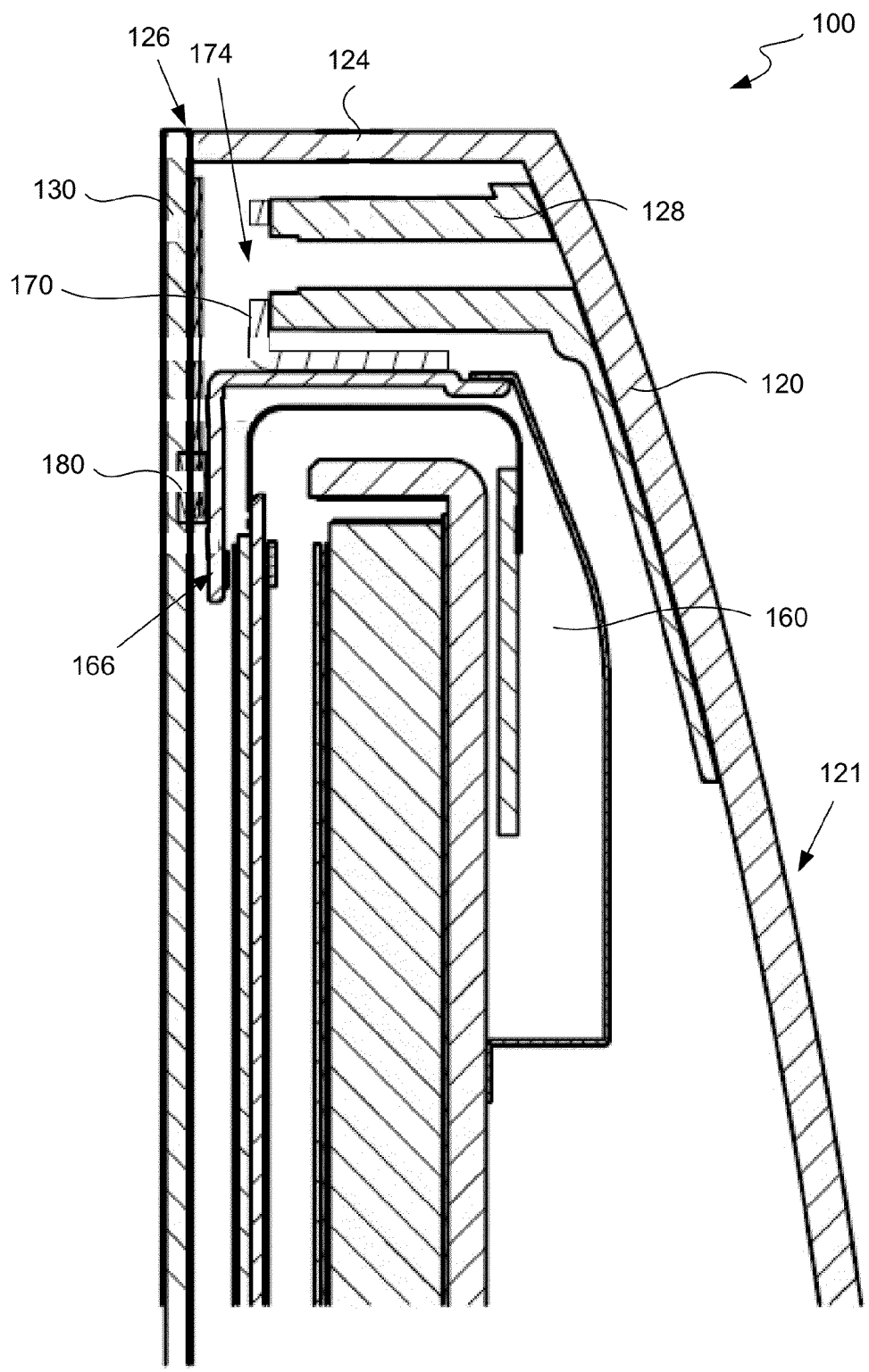
FIG. 6 illustrates in rotated and partial side cross-sectional view an exemplary electronic device having been assembled using the assembly fixture of FIG. 4 according to one embodiment of the present invention.

Turning next to FIG. 6, an exemplary electronic device having been assembled using the assembly fixture of FIG. 4 is depicted in rotated and partial side cross-sectional view. As will be readily understood, assembled electronic device 100 is depicted at a rotation of about 90 degrees with respect to that which has been illustrated previously. The final assembled device 100 includes an alignment that involves substantially parallel planes defined by display cover 130 and the front display face of internal display device 160. Again, outer housing 120 includes an outer surface 121 and one or more side walls 124 that terminate at an upper edge defining a housing reference datum 126. The backside of display cover 130 may contact this reference datum 126 in the final device 100.

As explained above, outer housing 120 is coupled to display device 160 by way of a plurality of mounting bosses 128 and mounting brackets 170. Each mounting bracket 170 has been specifically positioned and affixed along its contacted side of the display device by way of the assembly fixture, which is not a part of the finished device 100. Openings 174 in the flanges of the various mounting brackets 170 can be used to affix the mounting brackets to the mounting bosses 128. A sealing gasket 180 can be used to effect a seal between the cover glass 130 and display device 160. Again, the plane defined by display reference datum 166 is substantially parallel to the plane defined by housing reference datum 126, both of which are substantially parallel to the plane defined by display cover 130.

Figure 7A:
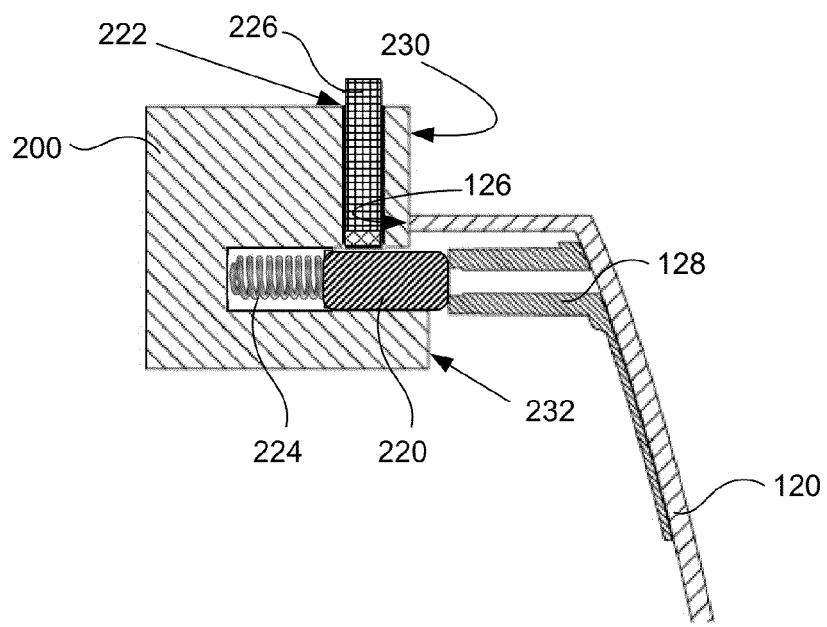
FIG. 7A illustrates in rotated and partial side cross-sectional view the assembly fixture of FIG. 4 interfacing with the outer housing component of FIG. 2A according to one embodiment of the present invention.
Figure 7B:
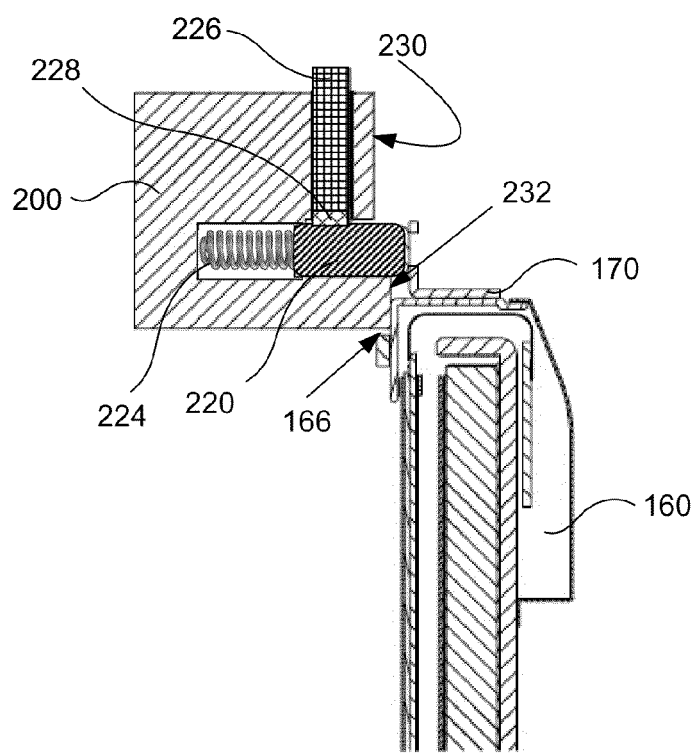
FIG. 7B illustrates in rotated and partial side cross-sectional view the assembly fixture as shown in FIG. 7A subsequently interfacing with the display device of FIG. 3 according to one embodiment of the present invention.

FIGS. 7A-7D all illustrate in rotated and partial side cross-sectional views the assembly fixture of FIG. 4 as interfacing with the outer housing component of FIG. 2A and the display device of FIG. 3 respectively. FIGS. 7A-7B depict one exemplary embodiment, while FIGS. 7C-7D reflect an alternative exemplary embodiment with respect to the operation of the recording pins 220.

As shown in FIG. 7A, the assembly fixture 200 can specifically interface with the outer housing component 120 such that outer reference datum 230 directly contacts housing reference datum 126. During this interfacing, recording pin 220 can be biased by internal coil spring 224 such that the pin extends away from the assembly fixture as much as possible before being physically stopped by mounting boss or feature 128. In effect, spring-loaded pin 220 is pushed inward by mounting boss 128 during this interfacing. Rather than using the biasing spring 224 shown, it will be readily appreciated that pneumatics, hydraulics, or other suitable biasing or actuating means can be used in conjunction with the recording pins 220.

A similar interaction happens for all of the recording pins 220, upon which each of the pins can then be locked in place by a suitable locking shaft 226 or other suitable mechanism, which can extend into fixture 200 by way of opening 222, for example. Such a locking shaft or pin 226 can have a low durometer rubber end 228 that is used to brake or hold recording pin 220 directly by way of a friction force. This locking mechanism can be actuated, for example, by way of a pneumatic or hydraulic actuation system (not shown), which can be arranged to actuate all of the locking mechanisms 226 on all of the recording pins 220. De-actuation of such an actuation system could then serve as a release mechanism for pins 220. Such spring-loaded pins 220, springs 224, locking mechanisms 226, and actuation and release mechanisms therefore are generally well known, and any suitable versions of such components can be used in conjunction with assembly fixture 200. As another example, each of locking shafts or pins 226 can be arranged to be manually actuated and locked or snapped in place, as may be desired.

Referencing FIG. 7B, the assembly fixture 200 with recording pins 220 all locked into place is then interfaced with a corresponding display device 160 to be used with the previous outer housing component 120. As shown, the assembly fixture 200 can specifically interface with the display device 160 such that inner reference datum 232 directly contacts display reference datum 166. The exact location and position of respective mounting brackets 170 can then be adjusted to correspond specifically to the positions of corresponding recording pins 220. In particular, mounting brackets 170 can be slid along the thin sides of display device 160 until the extended flanges directly contact the top edges of the recording pins 220. Mounting brackets 170 can then be affixed in place to the sides of the display device 160, and that display device is ready to be mounted to the previous outer housing 120.

Figure 7C:
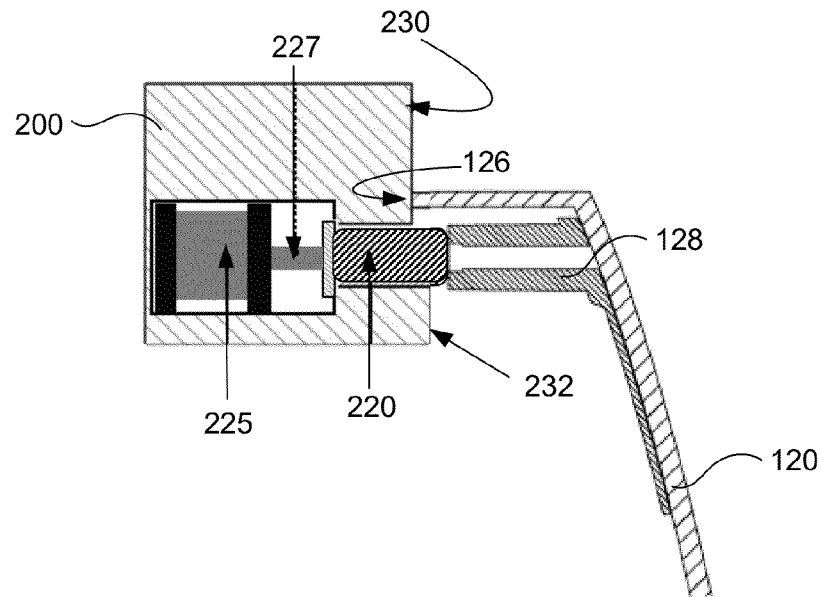
FIG. 7C illustrates in rotated and partial side cross-sectional view an alternative version of the assembly fixture of FIG. 4 interfacing with the outer housing component of FIG. 2A according to an alternative embodiment of the present invention.
Figure 7D:
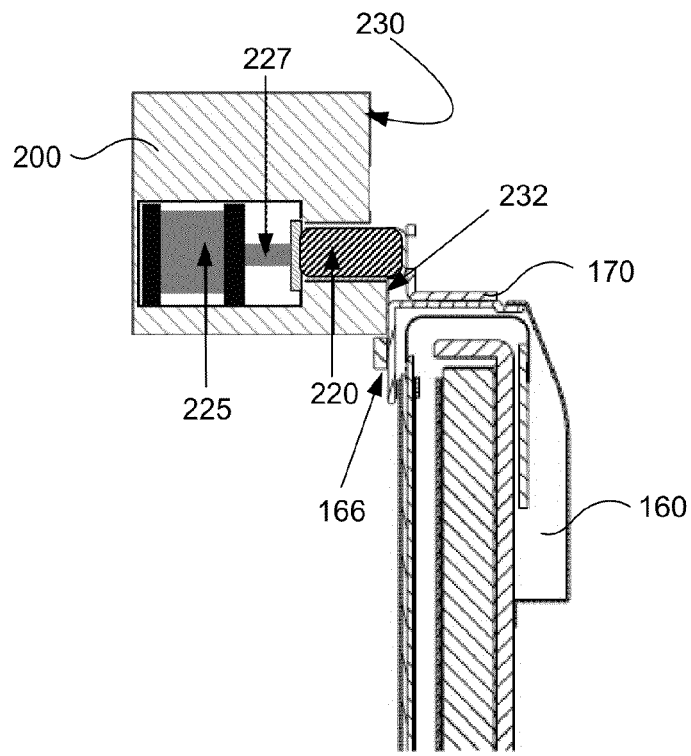
FIG. 7D illustrates in rotated and partial side cross-sectional view the assembly fixture as shown in FIG. 7C subsequently interfacing with the display device of FIG. 3 according to the alternative embodiment of the present invention.

Continuing with FIGS. 7C-7D, an alternative version involving a different way to actuate the recording pins is provided. As shown in FIG. 7C, the assembly fixture 200 similarly interfaces with the outer housing component 120 such that outer reference datum 230 directly contacts housing reference datum 126. During this interfacing, recording pin 220 can be biased by actuation device 225 and piston 227 such that the pin extends away from the assembly fixture as much as possible before being physically stopped by mounting boss or feature 128. Actuation device 225 can be, for example, a pneumatic actuator or a rotary step motor, although other types of actuation devices may also be used.

Again, a similar interaction happens for all of the recording pins 220, upon which each of the respective pistons 227 is locked in its respective recorded position by its respective actuation device 225. The respective recorded position for each piston 227 will be based on its respective pin 220 and respective feature 128. De-actuation of actuation device 225 could then serve as a release mechanism for the pistons 227 and pins 220.

Referencing FIG. 7D, the assembly fixture 200 has pistons 227 all locked into place such that the positions of recording pins 220 are all suitably fixed. This version of fixture 200 is then similarly interfaced with a corresponding display device 160 to be used with the previous outer housing component 120. Again, assembly fixture 200 can interface with display device 160 such that inner reference datum 232 directly contacts display reference datum 166. The exact location and position of respective mounting brackets 170 can then be adjusted to correspond specifically to the positions of corresponding recording pins 220, and the remaining process then follows just like that in FIG. 7B above.

Methods

Figure 8:
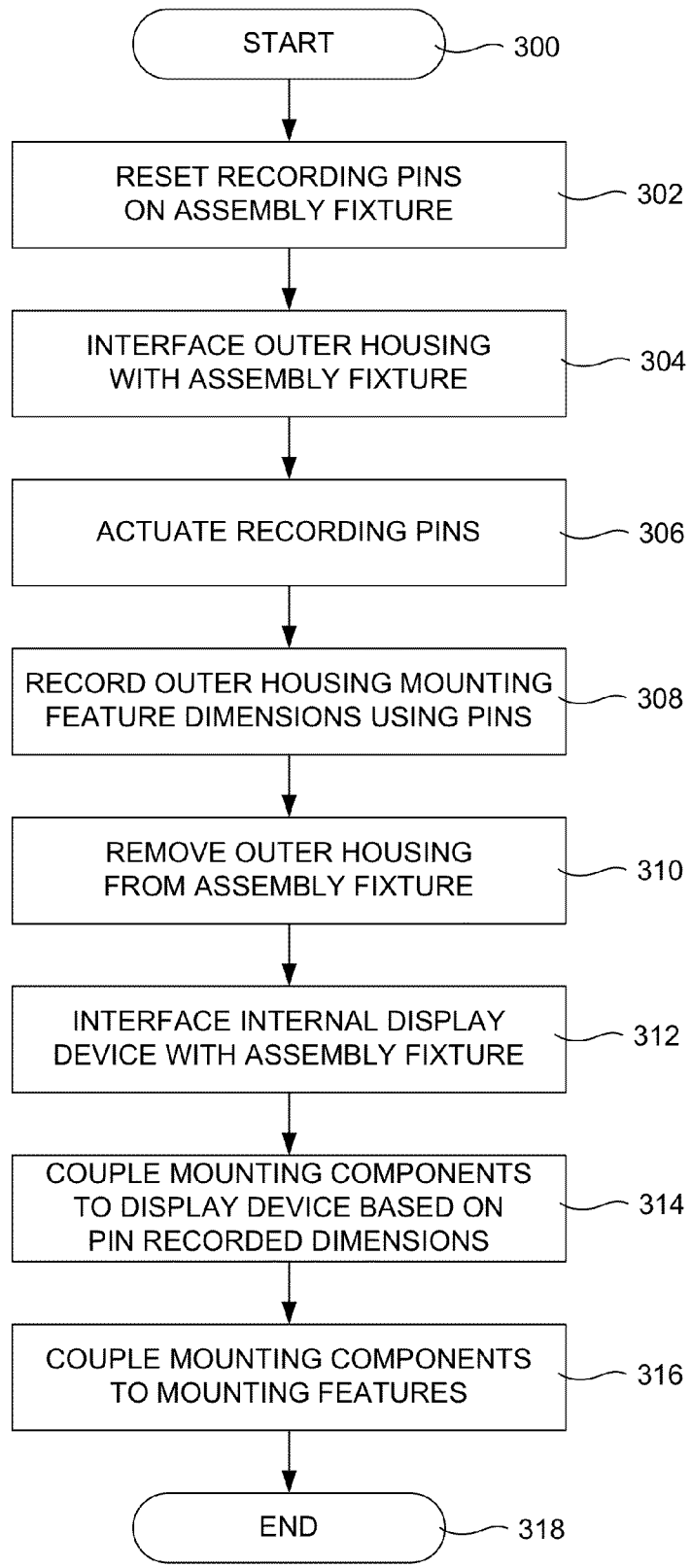
FIG. 8 provides a flowchart of an exemplary method of aligning components on an electronic device according to one embodiment of the present invention.

Lastly, FIG. 8 provides a flowchart of an exemplary method of aligning components on an electronic device according to one embodiment of the present invention. It will be understood that the provided steps are shown only for purposes of illustration, and that many other or different steps may be included in the process, as may be desired. Furthermore, the order of steps may be changed where appropriate and not all steps need be performed in various instances. For example, step 314 might be partially performed earlier in the process and then finalized after step 312, while step 302 may be performed at the end of the process rather than the beginning. Other differences may also be possible, and it will be readily appreciated that the described steps and order are not limiting in any way.

After a start step 300, an initial process step 302 can involves resetting the positions of a plurality of recording pins on the assembly fixture. Again, such pins can be spring-loaded and locking pins, as set forth above. In the event that the pins have already been reset or are otherwise "zeroed out," then step 302 can be bypassed. At subsequent process step 304, a first electronic device component is interfaced with a separate assembly fixture, where the first electronic device component can have a plurality of mounting features. The assembly fixture can include a plurality of recording pins, which can be in the form of spring-loaded and locking pins. In some embodiments, the first electronic device component can be an outer housing component. In addition, the mounting features can include mounting bosses that extend away from the device component.

At the following process step 306, the recording pins can be actuated while the device component remains interfaced with the assembly fixture. Such actuation can involve the spring-loaded pins contacting the mounting features such that the pins are moved and positioned according to the exact dimensions of the mounting features. In a particular example, the end of each pin contacts the upper end of a mounting boss such that the pin is moved in accordance with the height of the mounting boss. The pins can then be used to record the mounting feature dimensions at process step 308. This can be accomplished, for example, by using a locking feature on the pins such that they are locked into place to reflect the exact height of the mounting bosses or other mounting features.

The outer housing or other electronic device component can then be removed from the assembly fixture at process step 310, after which a second separate electronic device component is then interfaced with the assembly fixture at process step 312. In some embodiments, the second electronic device component can be an internal display device, such as a video display component or system. While the display device or other second component is interfaced with the assembly fixture, one or more mounting components can be coupled to the display device or other second electronic device component at process step 314. This can involve using the recording pin positions established at step 308, such that the mounting component(s) are specifically positioned based upon the pin recordings. In a particular example, the mounting component(s) can be screwed to the sides of the display device or other second electronic device component at elevations or locations that correspond to the specifically recorded pin positions.

The method then continues with process step 316, where the established mounting components can then be coupled to the mounting features of the outer housing or other first electronic device component. In this manner, the first electronic device component is coupled to the second electronic device component in a fashion that is customized for the exact dimensions of the involved parts. In a particular example, flanges of the mounting components can be screwed or otherwise fastened to mounting bosses extending from an outer housing component, such that the display device is appropriately aligned with respect to the outer housing component. Additional steps not depicted can include positioning a cover glass atop the assembled display device and outer housing combination, as well as placing a gasket between the cover glass and display device to effect a seal therebetween. As noted above in greater detail, additional aspects can include the presence and use of reference datums on the outer housing, the display device and the assembly fixture, such as during the interfacing process steps. The method then ends at end step 318.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An electronic device, comprising:
   an outer housing having a back portion, wherein the back portion includes an outer surface and an inner region, the inner region including a plurality of mounting features;
   a display cover coupled to the outer housing and adapted to be viewable therethrough, wherein the display cover defines a first plane; and
   a display device disposed between the back portion of the outer housing and the display cover, the display device comprising:
      a front face defining a second plane and adapted to provide a visual display for a user thereon, and
      a plurality of mounting components adjustably coupled to the display device and operative to secure the display device to the plurality of mounting features, wherein a coupling position of each of the plurality of mounting components is separately adjustable with respect to the front face of the display device in a direction substantially normal to the second plane to compensate for the specific dimensions of the outer housing and display device, such that the second plane is substantially parallel to the first plane.

2. The electronic device of claim 1, wherein the plurality of mounting components have been specifically positioned using a separate assembly fixture having a plurality of spring-loaded pins, each of the spring-loaded pins being adapted to measure one of the plurality of mounting features.

3. The electronic device of claim 2, wherein each of the spring-loaded pins is further adapted to lock into place to record its measurement of its respective one of the plurality of mounting features.

4. The electronic device of claim 1, further including:
a compressible gasket situated between the display cover and the display device, wherein the compressible gasket provides a seal between the display cover and display device that blocks contamination therefrom.

5. The electronic device of claim 1, wherein the plurality of mounting features comprise a plurality of mounting bosses that extend away from the back portion toward the display device.

6. The electronic device of claim 1, wherein the plurality of mounting components comprises a plurality of mounting brackets coupled to the sides of the display device, the plurality of mounting brackets each including a flange that couples with corresponding mounting features.

7. The electronic device of claim 6, wherein each of the plurality of mounting brackets are screwed to a side of the display device.

8. The electronic device of claim 1, wherein the outer housing further includes one or more side portions that extend around the perimeter of and are integrally formed with the back portion, and wherein the upper distal edge around the one or more side portions defines a reference datum with respect to the display cover.

9. The electronic device of claim 1, wherein the adjustable positioning of the one or more mounting components results in the ability to have one or more greater dimensional tolerances for the outer housing, the display device, the plurality of mounting features, or any combination thereof.

10. An assembly fixture adapted for use in the manufacture of a separate electronic device, the assembly fixture comprising:
a fixture body defining a frame having a top surface, a bottom surface and an outer circumference that is dimensioned to permit interaction with a plurality of different components from the separate electronic device;
a plurality of spring-loaded and locking pins situated proximate the top surface of the fixture body, wherein each of the plurality of spring-loaded and locking pins is adapted to be actuated by and record the height of a corresponding mounting feature located on an outer housing component of the separate electronic device when the outer housing component is interfaced with the assembly fixture; and
one or more release mechanisms adapted to release and reset the plurality of spring-loaded and locking pins from locked to unlocked positions so that the assembly fixture can be used with a different separate electronic device.

11. The assembly fixture of claim 10, wherein each of the plurality of spring-loaded and locking pins records the height of its corresponding mounting feature by moving a distance corresponding to said height and locking into place accordingly.

12. The assembly fixture of claim 10, wherein each of the plurality of spring-loaded and locking pins are further adapted to translate the recorded heights of their respective mounting features in order to facilitate the specific positioning of one or more mounting components of the separate electronic device onto a display device of the separate electronic device when the one or more mounting components and display device are subsequently interfaced with the assembly fixture.

13. The assembly fixture of claim 12, wherein the specific positioning of the one or more mounting components is adapted to compensate for the specific dimensions of the outer housing component, mounting features thereof, mounting components, display device, or any combination thereof, in order to provide an improved alignment between components of the separate electronic device.

14. The assembly fixture of claim 13, wherein the improved alignment is provided between the display device and a cover glass of the separate electronic device.

15. The assembly fixture of claim 10, wherein at least a portion of the fixture body top surface defines a fixture reference datum, and wherein the fixture reference datum is adapted to contact a corresponding separate reference datum on the outer housing component when the outer housing component is interfaced with the assembly fixture.

16. A method of aligning components on an electronic device, comprising:
interfacing a first electronic device component with a separate assembly fixture, the first electronic device component having a plurality of mounting features;
actuating a plurality of spring-loaded and locking pins on the assembly fixture while the first electronic device component is interfaced therewith;
recording the respective heights of the plurality of mounting features using the respective positions of the actuated plurality of spring-loaded and locking pins;
removing the first electronic device component form the assembly fixture;
interfacing a second electronic device component with the assembly fixture;
coupling one or more mounting components to the second electronic device component in one or more specific locations that correspond to the recorded heights of the plurality of mounting feature; and
coupling the one or more mounting components to the plurality of mounting features.

17. The method of claim 16, further including the step of:
resetting the plurality of spring-loaded and locking pins.

18. The method of claim 16, wherein the first electronic device component comprises an outer housing, and wherein the second electronic device component comprises an internal display device.

19. The method of claim 16, wherein each of the interfacing steps includes placing a datum of the separate assembly fixture into contact with a datum of the respective electronic device component.

20. The method of claim 16, wherein the recording step includes locking the plurality of spring-loaded and locking pins into place.

* * * * *

UNITED STATES PATENT AND TRADEMARK OFFICE
CERTIFICATE OF CORRECTION

PATENT NO. : 8,582,316 B2  
APPLICATION NO. : 13/228282  
DATED : November 12, 2013  
INVENTOR(S) : Houtan R. Farahani et al.

Page 1 of 1

It is certified that error appears in the above-identified patent and that said Letters Patent is hereby corrected as shown below:

In the Claims:

Col. 12, line 60: Change "for the specific dimensions" to "for specific dimensions".

Col. 13, line 24: Change "around the perimeter" to "around a perimeter".

Col. 13, line 29: Change "one or more mounting" to "plurality of".

Col. 13, line 44: Change "record the height" to "record a height".

Col. 14, line 37: Change "form" to "from".

Signed and Sealed this
First Day of April, 2014

Michelle K. Lee
*Deputy Director of the United States Patent and Trademark Office*